United States Patent [19]

Kovacik et al.

[11] Patent Number: 5,232,657
[45] Date of Patent: Aug. 3, 1993

[54] METAL HYDRIDE FLUX TRAP NEUTRON ABSORBER ARRANGEMENT FOR A NUCLEAR FUEL STORAGE BODY

[75] Inventors: William P. Kovacik, Hempfield Township, Westmoreland County; Donald E. Mueller, Plum Borough, both of Pa.

[73] Assignee: Westinghouse Electric Corp., Pittsburgh, Pa.

[21] Appl. No.: 723,035

[22] Filed: Jun. 28, 1991

[51] Int. Cl.⁵ .................. G21C 19/40; G21C 7/10
[52] U.S. Cl. .................. 376/272; 376/327; 376/333
[58] Field of Search .............. 376/327, 333, 272, 223

[56] References Cited

U.S. PATENT DOCUMENTS

| | | | |
|---|---|---|---|
| 3,720,752 | 3/1973 | Van Houten | 423/255 |
| 3,943,210 | 3/1976 | Vetrano . | |
| 4,039,842 | 8/1977 | Mollen | 376/272 |
| 4,088,897 | 5/1978 | Soot | 376/272 |
| 4,143,276 | 3/1979 | Mollon | 376/272 |
| 4,203,038 | 5/1980 | Takahashi et al. | 376/272 |
| 4,218,622 | 8/1980 | McMurtry et al. | 376/272 |
| 4,248,668 | 8/1981 | Dixon et al. | 376/272 |
| 4,339,411 | 7/1982 | Knackstedt et al. | 376/272 |
| 4,382,060 | 5/1983 | Holtz et al. | 376/272 |
| 4,388,268 | 6/1983 | Knackstedt et al. | 376/272 |
| 4,399,366 | 8/1983 | Bucholz | 376/272 |
| 4,400,344 | 8/1983 | Wachter et al. | 376/272 |
| 4,617,170 | 10/1986 | Suchy | 376/272 |
| 4,743,423 | 5/1988 | Turner et al. | 376/287 |
| 4,780,268 | 10/1988 | Papai et al. | 376/272 |
| 4,781,883 | 11/1988 | Daugherty et al. | 376/272 |
| 4,948,553 | 8/1990 | Machado et al. | 376/272 |

FOREIGN PATENT DOCUMENTS 0088877 3/1983 European Pat. Off. .
49-40842 8/1974 Japan .
61-290400 12/1986 Japan .

Primary Examiner—Harvey E. Behrend

[57] ABSTRACT

A flux trap neutron absorber arrangement for use in a fuel storage body between a pair of fuel storage cans which receive and store nuclear fuel assemblies includes separate pockets spaced from one another and extending vertically along and attached to the exterior of each of the adjacent side walls of adjacent spaced storage cans, an elongated flat plate of a thermal neutron absorber material mounted in each pocket, the plates of thermal neutron absorber material being likewise spaced from one another and defining a fast neutron slow-down region therebetween, a slab of a metal hydride disposed in the fast neutron slow-down region between the plates of thermal neutron absorber material and the separate pockets on the adjacent side walls, a canister containing the slab of the metal hydride being disposed in the fast neutron slow-down region, the canister being connected to at least one of the adjacent side walls of the adjacent storage cans. The thermal neutron absorber material of the plates is usually boron carbide. Preferably, the metal hydride of the slabs is usually titanium hydride.

5 Claims, 5 Drawing Sheets

METAL HYDRIDE FLUX TRAP NEUTRON ABSORBER ARRANGEMENT FOR A NUCLEAR FUEL STORAGE BODY

BACKGROUND OF THE INVENTION

1. Field of the Invention

The present invention relates generally to nuclear fuel storage and shipping and, more particularly, is concerned with an improved flux trap neutron absorber arrangement for a fuel storage body, such as a fuel shipping cask or a fuel storage pool of a fuel storage facility.

2. Description of the Prior Art

A fuel storage facility provides for on-site storage of both new and spent fuel assemblies at nuclear power plants. The fuel storage facility includes a fuel pit or pool which is a reinforced concrete structure with a stainless steel liner, filled with borated reactor makeup water. Fuel storage containers or cans of square cross-section and standing upright in a spaced side-by-side array are provided under water in the fuel pool. The cans are designed to accommodate a large number of fuel assemblies, for example 850, at predetermined locations such that the fuel assemblies are maintained in a sub-critical array in the fuel pool.

Neutron absorbers or poisons, such as boron carbide, in slab-like form are typically mounted in narrow pockets extending vertically along the sides of the cans, with the makeup water filling the remainder of the space between the cans, to assist in maintaining the fuel in a condition of subcriticality. Fast neutrons are emitted by the fuel and therefore it is desirable to be able to slow them so that they can be absorbed more effectively in the absorber material.

The slabs of boron carbide and volume of borated makeup water between them serve as a flux trap neutron absorber arrangement in the storage pool between the stored fuel assemblies. The water provides a fast neutron slow-down region with the surrounding boron carbide, in the slab or plate form, providing a thermal neutron absorber. The fast neutrons enter into the water contained in the slow-down region between the boron carbide plates of thermal neutron absorber. The hydrogen atoms in the water slow the fast neutrons down between the plates so that they can be absorbed by the thermal neutron absorber of the plates.

A plurality of such flux trap neutron absorber arrangements are located between the cans containing the fuel assemblies to assist in maintaining the fuel assembly array in a safe shutdown subcritical condition. Because the pool space is fixed at the nuclear power plants and the demand for more and higher enrichment fuel storage is becoming critical, there is a need for maximizing the amount of fuel that can be stored there. As a result the minimization of the storage cell structural volume in the pool is important. Dimensional changes as small as 0.1 inch are critical to the designer, in meeting the subcriticality requirements, maximizing the storage capacity, and minimizing material requirements.

Consequently, there is a pressing need for improvements in the design of the flux trap absorber arrangement for maximizing available fuel storage space.

SUMMARY OF THE INVENTION

The present invention provides an improved flux trap neutron absorber arrangement designed to satisfy the aforementioned needs. The arrangement of the present invention replaces some of the fast neutron moderating or slowing water used in a fuel storage body, such as a fuel storage pool or fuel shipping cask, with a metal hydride. Since the efficiency of the design of a flux trap neutron absorber arrangement depends upon the slow-down of fast neutrons by hydrogen atoms or other low mass elements in the trap region, the higher the hydrogen density, the more efficient is the design. Some metal hydrides have a higher hydrogen density than water and thus will increase the efficiency of the flux trap neutron absorber arrangement. Their use also allows storage of fuels of higher enrichment.

Furthermore, the use of a metal hydride would eliminate the variation in hydrogen density in the water with water temperature. As the water temperature rises, the volumetric hydrogen density decreases which reduces the absorber efficiency. In some design cases, this effect can be important.

Accordingly, the present invention is directed to a plurality of flux trap neutron absorber arrangements set forth in a nuclear fuel storage body. The fuel storage body includes a pool of fast neutron slowing fluid and a plurality of upright storage cans submerged in the fluid and disposed in a spaced side-by-side array. Each storage can is composed of a plurality of side walls connected together to receive and store a nuclear fuel assembly. The plurality of flux trap neutron absorber arrangements are disposed in the storage body between the storage cans.

In one embodiment of the present invention, each flux trap neutron absorber arrangement comprises: (a) separate means extending vertically along and attached to the exterior of each of the adjacent side walls of adjacent spaced storage cans for forming respective pockets extending along the adjacent side walls and being spaced from one another; (b) an elongated flat plate of a thermal neutron absorber material mounted in each of the pockets, the plates of thermal neutron absorber material being likewise spaced from one another and defining a fast neutron slow-down region therebetween; (c) a slab of a metal hydride disposed in the fast neutron slow-down region between the plates of thermal neutron absorber material and the separate pocket forming means on the adjacent side walls; and (d) a canister containing the slab of the metal hydride being disposed in the fast neutron slow-down region, the canister being connected to at least one of the adjacent side walls of the adjacent storage cans.

In another embodiment of the present invention, each flux trap neutron absorber arrangement comprises: (a) at least one elongated flat plate of a thermal neutron absorber material mounted between each adjacent pair of the spaced storage cans and adjacent one of the side walls of the storage cans, the plate of thermal neutron absorber material and the other of the side walls of the storage cans defining a fast neutron slow-down region therebetween; (b) a slab of a metal hydride disposed in the fast neutron slow-down region between the plate of thermal neutron absorber material and the other side wall of the storage cans; and (c) a canister containing the plate of thermal neutron absorber material and the slab of metal hydride, the canister being connected to at least one of the adjacent side walls of the adjacent storage cans. In one form, the means extending vertically along and attached to one of the adjacent side walls of the adjacent storage cans forms a pocket extending along the one side wall, and a second elongated flat plate of a thermal neutron absorber material is mounted in the pocket.

In both embodiments of the arrangement, the thermal neutron absorber material of the plates preferably is boron carbide. Preferably, the metal hydride of the slabs is titanium hydride. Alternatively, the metal hydride can be gadolinium-titanium hydride or a rare earth hydride.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like references characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Figure 1:
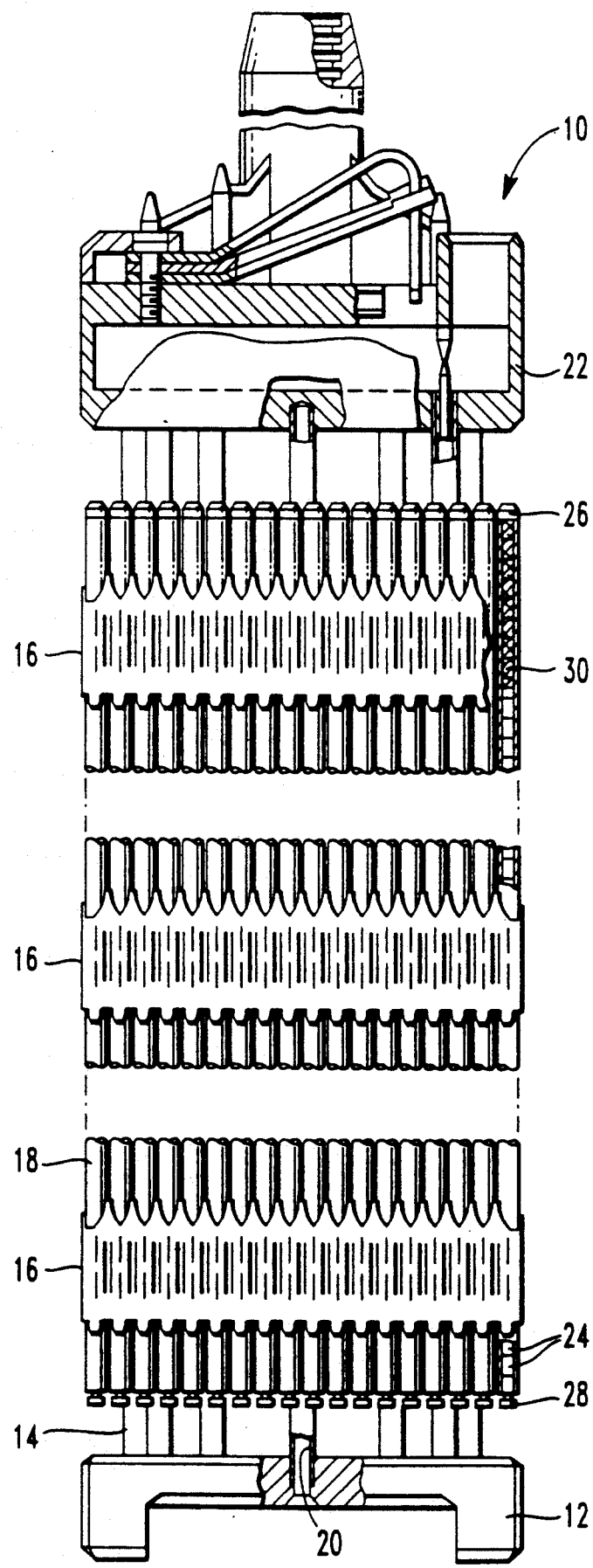
FIG. 1 is a side elevational view, with parts partially sectioned, foreshortened, and broken away for purposes of clarity, of a prior art fuel assembly which, when its fuel is spent, is stored in a fuel storage pool.

Referring now to the drawings, and particularly to FIG. 1, there is shown a prior art nuclear fuel assembly, generally designated 10. Being the type use in a pressurized water nuclear reactor (PWR), the prior art fuel assembly 10 basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 removably attached to the upper ends of the guide thimbles 14 to form an integral assembly capable of being conventionally handled without damaging the assembly parts.

As mentioned above, the fuel rods 18 in the array thereof in the assembly 10 are held in spaced relationship with one another by the grids 16 spaced along the fuel assembly length. Each fuel rod 18 includes nuclear fuel pellets 24 and the opposite ends of the rod are closed by upper and lower end plugs 26, 28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the nuclear reactor. A liquid moderator/coolant such as water, or water containing boron, is pumped upwardly through the fuel assemblies of the core in order to extract heat generated therein for the production of useful work.

Prior Art Fuel Assembly Storage

Figure 2:
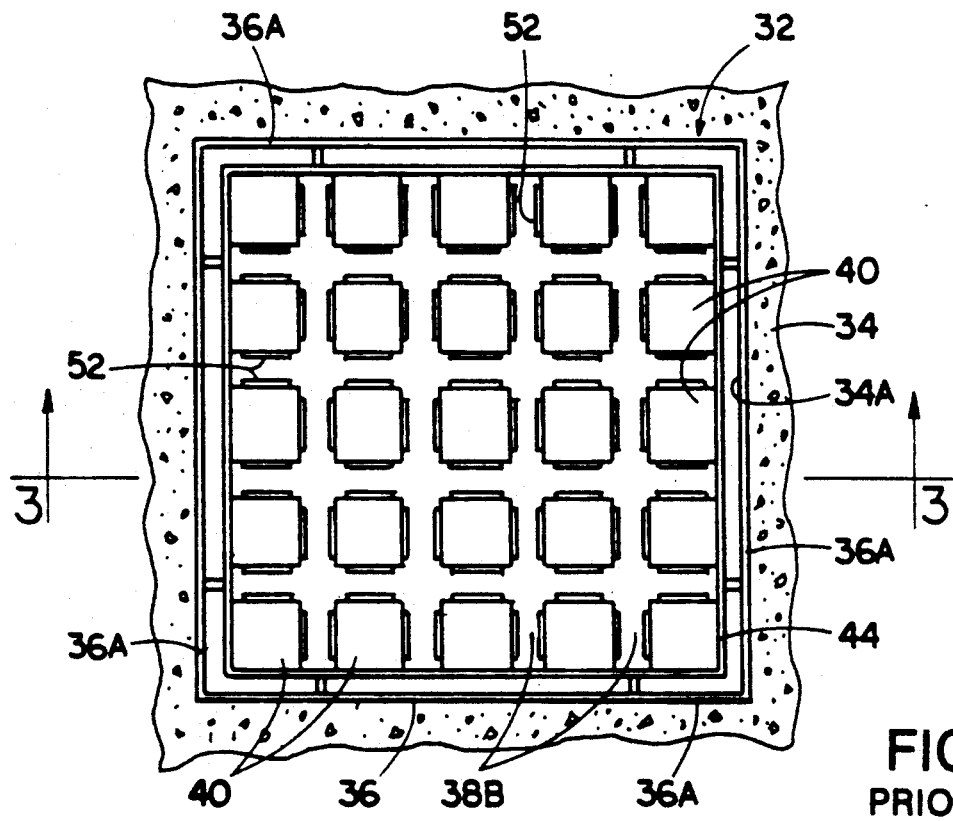
FIG. 2 is a top plan view of a prior art fuel storage pool having a plurality of upright storage cans filled with fuel assemblies and incorporating a plurality of prior art flux trap neutron absorber arrangements between the storage cans.
Figure 3:
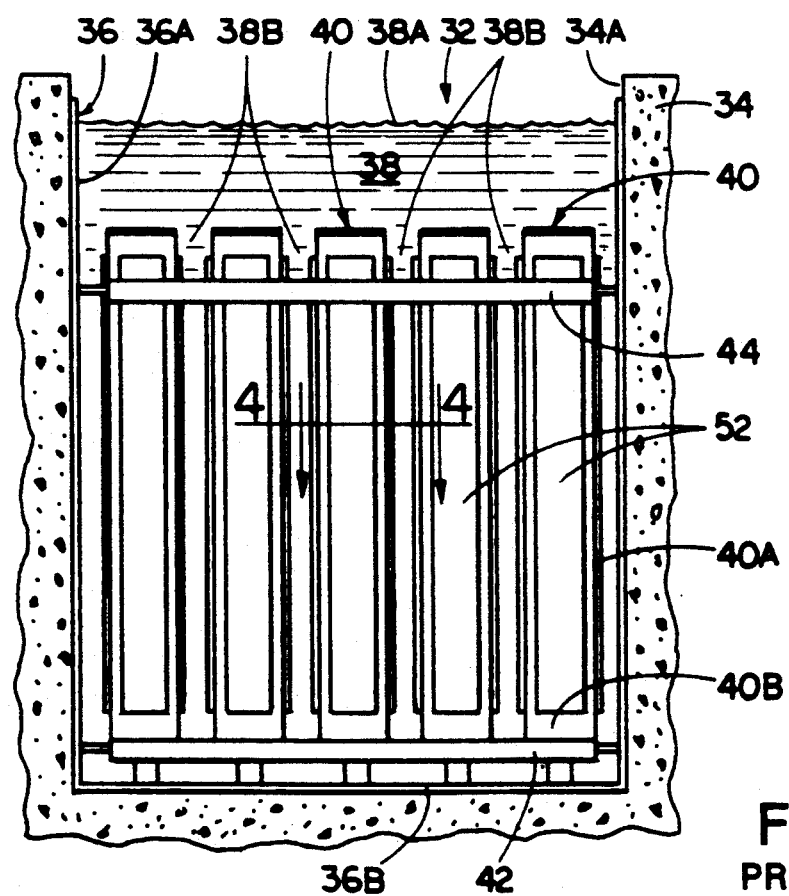
FIG. 3 is a longitudinal sectional view of the prior art fuel storage pool taken along line 3—3 of FIG. 2.

Referring to FIGS. 2 and 3, when fresh fuel is received at a nuclear power plant, the fuel assemblies are usually stored in a storage pool 32 of a fuel storage facility provided on-side at the plant until they can be loaded into the reactor. Or, when a significant proportion of the reactivity of the fuel pellets has been used up or spent, the spent fuel assemblies are then removed from the reactor core and transferred to the storage pool 32.

As seen in FIGS. 2 and 3, the fuel storage pool 32 is a reinforced concrete structure 34 defining an open-top cavity 34A. A stainless steel liner 36 is disposed in the cavity 34A. The lined cavity 34A is filled with a fluid capable of moderating or slowing fast neutron, such as borated reactor makeup water 38. The liner 36 is composed of a plurality of generally vertical sides 36A and a horizontal floor 36B which are interconnected to provide a box-like construction.

Fuel storage containers or cans 40 are provided standing upright on a lower platform 42 supported in pier-like fashion on the floor 36B of the cavity liner 36. Each storage can 40 is rectangular in cross-section and has an open top defined by a plurality of side walls 40A rigidly connected together. Each storage can 40 also has a bottom wall 40B rigidly connected to the lower edges of the side walls 40A. A rectangular brace 44 is mounted by the liner 36 and surrounds the upper portions of the storage cans 40 is assist in retaining the cans 40 in a spaced side-by-side array under the surface 38A of the pool of water 38. The upright array of storage cans 40 are thus designed to accommodate a large number of fuel assemblies 10 (FIG. 1) at predetermined locations such that the fuel assemblies are maintained in a subcritical array in the fuel storage pool 32.

Figure 4:
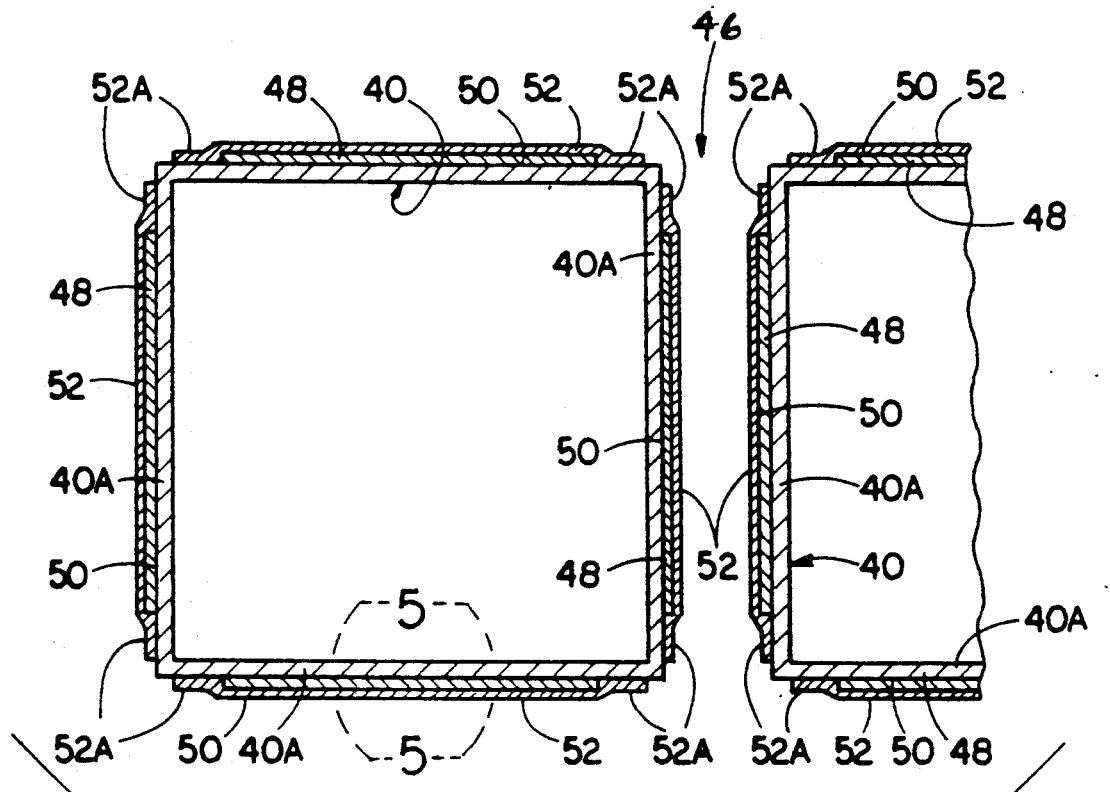
FIG. 4 is an enlarged fragmentary cross-sectional view of an adjacent pair of the storage cans as taken along line 4—4 of FIG. 3 illustrating in detail the prior art flux trap neutron absorber arrangement located between the storage cans.
Figure 5:
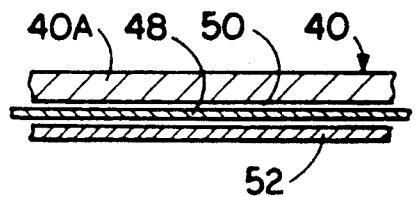
FIG. 5 is an enlarged fragmentary view of a sidewall of the storage can and a portion of the prior art flux trap neutron absorber arrangement associated therewith.

As seen in FIGS. 2 and 3, and in greater detail in FIGS. 4 and 5, a plurality of prior art flux trap neutron absorber arrangements 46 are provided in the storage pool 32 between the storage cans 40 containing the fuel assemblies. Each flux trap neutron absorber arrangement 46 includes a pair of elongated flat slabs or plates 48 of a neutron absorber or poison, such as boron carbide, and a volume or column 38B of borated makeup water 38 between them. Each neutron absorber plate 48 is typically mounted in a narrow gap or pocket 50 defined between the exterior of a side wall 40A of each storage can 40 and an outer elongated covering 52 extending vertically along each side wall 40A of the storage can 40 and attached along its peripheral edges to the can side wall 40A. The outer covering 52 is preferably in the form of an elongated sheet or plate of metal, such as stainless steel, the same material as preferably composes the side walls 40A and bottom wall 40B of each storage can 40. The column 38B of makeup water fills the remainder of the space between the outer coverings 52 on adjacent storage cans 40.

These prior art flux trap neutron absorber arrangements 46 assist in maintaining the fuel in a condition of subcriticality. The columns 38B in the borated makeup water 38 which fills the storage pool 32 constitutes and occupies fast neutron slow-down regions disposed between spaced pairs of adjacent storage cans 40. Fast neutrons continue to be emitted by the stored fuel and therefore it is desirable to be able to slow them so that they can be absorbed more effectively in the plates 48 of absorber material. The fast neutrons enter the columns 38B of water contained in the slow-down region between the boron carbide plates 48 of thermal neutron absorber, where the hydrogen atoms in the water 38 slow the fast neutrons down between the plates 48 so that they can be absorbed by the thermal neutron absorber material.

Improved Flux Trap Neutron Absorber Arrangements of the Invention

Turning now to FIGS. 6-9, there is illustrated variations of two basic embodiments of improved flux trap neutron absorber arrangements of the present invention. Each of the flux trap neutron absorber arrangements is used in the fuel storage pool 32 in the space between each pair of adjacent storage cans 40 and, primarily, replace some of the makeup water 38 previously employed in the prior art flux trap arrangements 46, with a metal hydride.

Figure 6:
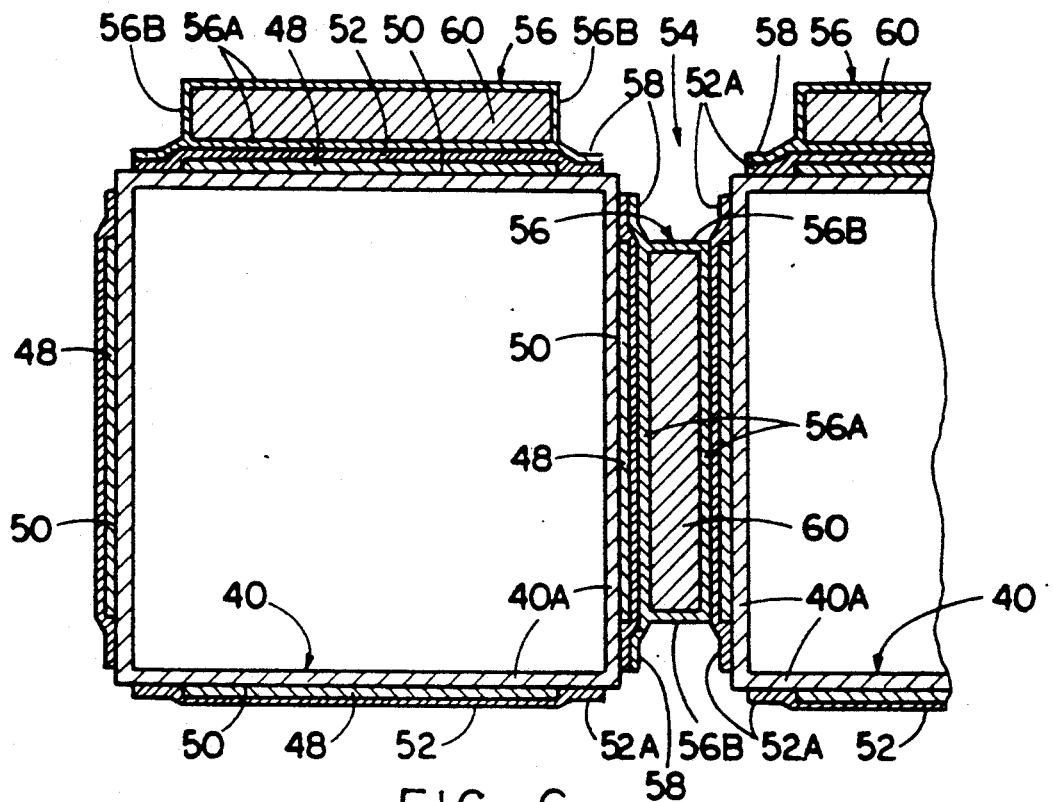
FIG. 6 is a cross-sectional view similar to that of FIG. 4, but illustrating one flux trap neutron absorber arrangement in accordance with the present invention.
Figure 8:
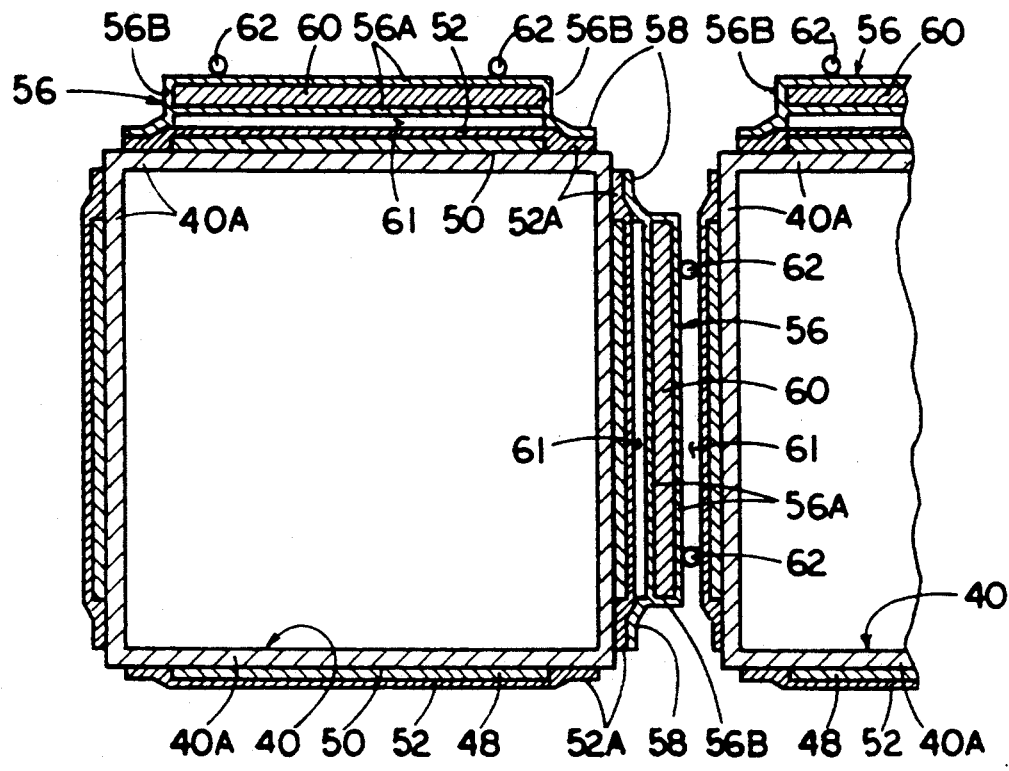
FIG. 8 is a cross-sectional view similar to that of FIG. 7, but illustrating still another flux trap neutron absorber arrangement in accordance with the present invention.

Referred to FIGS. 6 and 8, there is illustrated one basic embodiment of the improved flux trap neutron absorber arrangement, generally designated 54. The improved flux trap arrangement 54 includes the neutron absorber plates 48 in the pockets 50 defined between the coverings 52 and storage can side walls 40A, substantially the same in construction as provided in the prior art flux trap arrangement 46 of FIG. 4. The neutron absorber plates 48 are formed of the same material as before, preferably boron carbide.

However, instead of the columns 38B of water, the improved flux trap neutron absorber 46 employs a hollow metal canister 56 having a rectangular cross-section defined by opposite side walls 56A and opposite lateral end walls 56B extending between and rigidly interconnecting the side walls. One of the side walls 56A of the canister 56 has lateral mounting flanges 58 extending in opposite directions outwardly from opposite vertical edges thereof. The lateral mounting flanges 58 are attached to the opposite vertical edge portions 52A of the covering 52 on one of the adjacent storage cans 40. The canister 56 is closed at its opposite upper and lower ends and occupies the space between the adjacent storage cans 40 previously occupied by the column 38B of makeup water.

The canister 56 is filled with a slab 60 of a metal hydride which is more effective than makeup water in slowing fast neutrons. The metal hydride slab 60 is disposed in contact with the side and end walls 56A, 56B of the canister 56. It will be noted in the variations of the one embodiment of FIGS. 6 and 8 that only two adjacent side walls 40A of the four side walls of each storage can 40 mount respective canisters 56, the other two adjacent side walls 40A do not. In FIG. 6, the other two adjacent side walls 40A of the can 40 are abutted by the respective canisters 56, while in FIG. 8, the other two adjacent side walls 40A of the can 40 are spaced from the respective canisters 56.

The main difference between the two variations of the basic embodiment of FIGS. 6 and 8 relates to the amount of makeup water 38 displaced by the arrangement 54. In FIG. 6, the respective side walls 56A of the canister 56 are disposed in contact with the adjacent storage cans 40 so that no gap and thus no water 38 is present within the flux trap neutron absorber arrangement 54. In contrast thereto, in FIG. 8 the respective side walls 56A of the canister 56 are disposed in spaced relation with the adjacent storage cans 40 so that a gap 61 and thus water 38 is present within the flux trap neutron absorber arrangement 54. Also, in FIG. 8 there is a plurality of spacer members 62, for example two such members 62, disposed between one of the side walls 56A of each canister 56 and one of the adjacent storage cans 40. The spacer members 62 are spaced from one another and extend axially therealong to space the canister side wall 56A from the one storage can 40.

Figure 7:
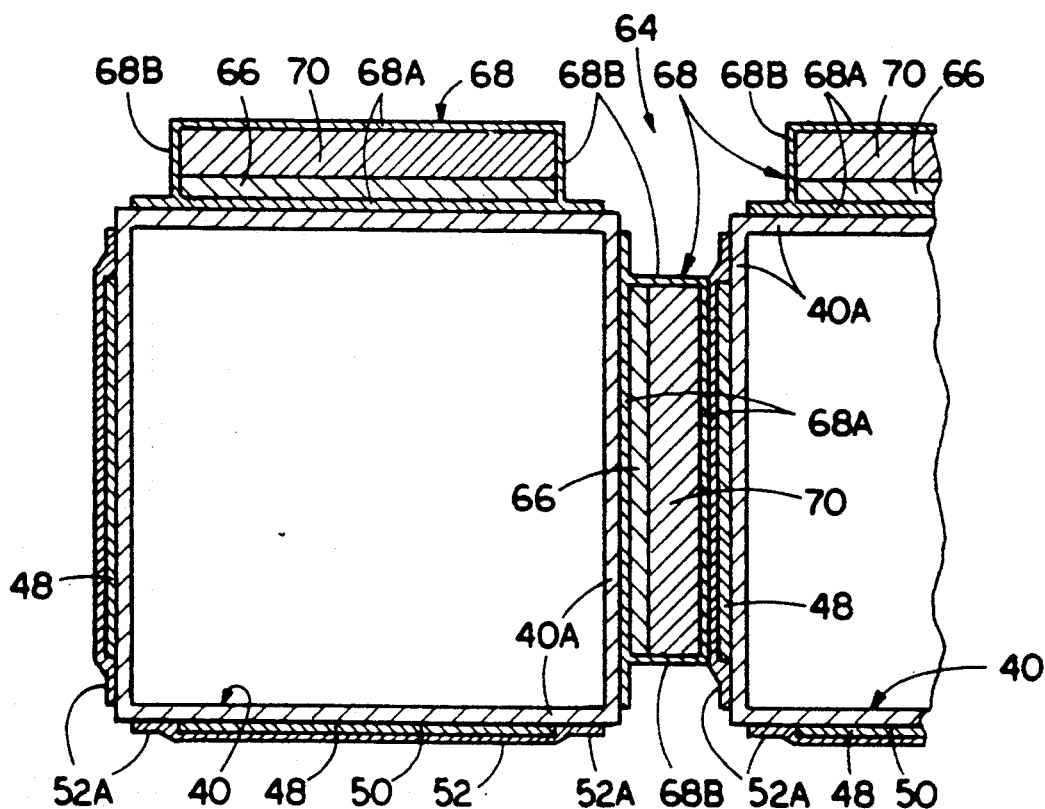
FIG. 7 is a cross-sectional view similar to that of FIG. 6, but illustrating another flux trap neutron absorber arrangement in accordance with the present invention.
Figure 9:
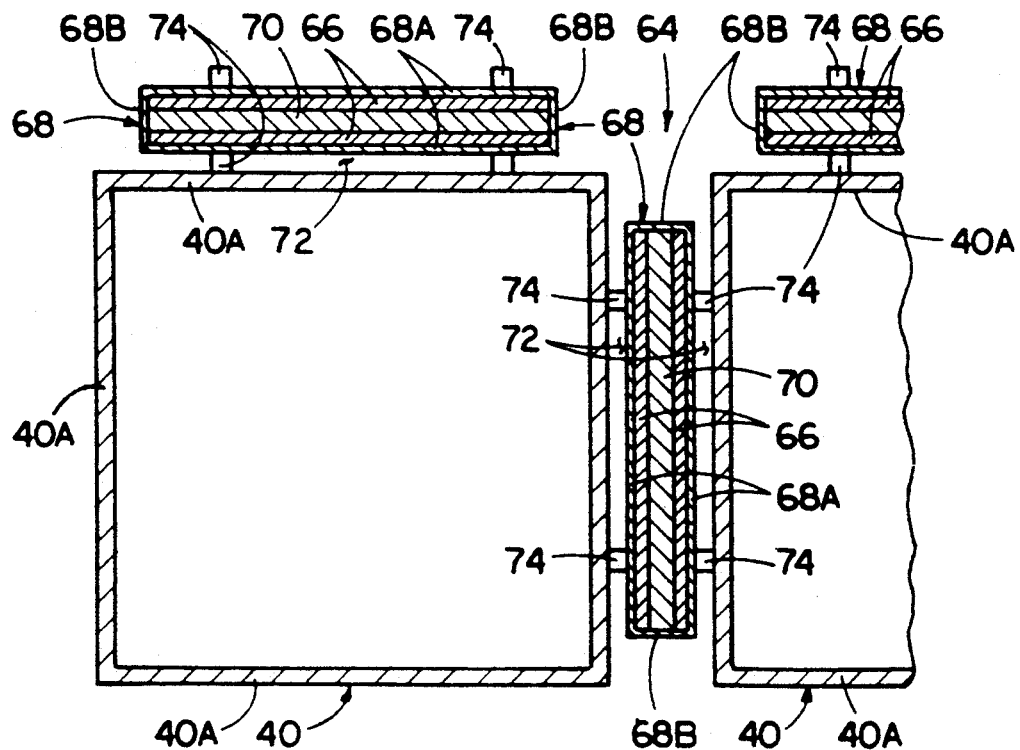
FIG. 9 is a cross-sectional view similar to that of FIG. 8, but illustrating yet another flux trap neutron absorber arrangement in accordance with the present invention.

Referring to FIGS. 7 and 9, there is illustrated another embodiment of the improved flux trap neutron absorber arrangement, generally designated 64. In contrast the one embodiment of FIGS. 6 and 8, the other embodiment of FIGS. 7 and 9 relocates at least one neutron absorber plate 66 from one of the pockets along the side wall 40A of one of the adjacent pair of storage cans 40 into a canister 68 disposed between the pair of adjacent storage cans 40. The plate 66 is located side-by-side with a slab 70 of the metal hydride in the canister 68. In FIG. 7, one neutron absorber plate 48 remains in the pocket 50 defined between the covering 52 and the side wall 40A of the other of the adjacent storage cans, in substantially the same construction as provided in the prior art flux trap arrangement 46 of FIG. 4 and the improved flux trap arrangement of FIG. 6. The neutron absorber plates 66, 48 are formed by the same material as before, preferably boron carbide. In FIG. 9, a pair of plates 66 of thermal neutron absorber material are disposed in the canister 68 on opposite sides of the slab 70 of metal hydride. The plates 66 and slab 70 are disposed in side-by-side contacting relation with one another and in contact with the side and lateral end walls 68A, 68B of the canister 68.

Furthermore, in FIG. 7, the side walls 68A of the canister 68 are disposed in contact with the adjacent storage cans 40 such that no gap and thereby no fast neutron slowing fluid is present between the canister 68 and the adjacent storage cans 40. In contrast thereto, in FIG. 9, the side walls 68A of the canister 68 are spaced from adjacent storage cans 40 such that a gap 72 and thereby fast neutron slowing fluid is present between each of the side walls 68A of the canister 68 and the adjacent storage cans 40. A plurality of spacer members 74 are disposed between the side walls 68A of the canister 68 and the adjacent storage cans 40 and extend axially therealong to space the canister side walls from the storage cans. Thus, the amount of makeup water displaced is greater in FIG. 7 than in FIG. 9.

Preferably, the metal hydride slabs 60, 70 of all embodiments are composed of titanium hydride having a hydrogen density greater than that of water. For example, titanium hydride has a hydrogen density about fifty percent larger than that of an equal volume of water (9.4 E22 atoms/cc versus 6.7 E22 atoms/cc). Thus, a smaller volume of titanium hydride can provide the same neutron slow-down ability as a larger volume of water and thereby the overall dimensions of the improved flux trap absorber arrangements 54, 64 can be made smaller. Neutronic calculations, made for a typical storage pool design, show that the use of a metal hydride, such as titanium (TiH$_2$) hydride, instead of water can reduce the cell structure dimension by almost 0.4 inch, a significant savings in space.

Furthermore, titanium hydride is a stable non-corroding material. Hydrogen evolution does not occur until temperatures of about 300 degrees C. are reached. It has suitable strength and ductility which would lend itself to the required fabrication process. The use of other metal hydrides may be feasible. For example, using a metal which in itself absorbs neutron would increase the effectiveness of the improved flux trap absorber arrangements. Such a material might be gadolinium-titanium hydride or a rare earth hydride.

It should understood that the principles of the present invention are equally applicable to spent fuel shipping casks which are small portable storage pools.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a nuclear fuel storage body including a pool of fast neutron slowing fluid and a plurality of upright storage cans submerged in said fluid and disposed in a spaced side-by-side array, each storage can being composed of a plurality of side walls connected together to receive and store a nuclear fuel assembly, a plurality of flux trap neutron absorber arrangements disposed in said storage body between said storage cans, each of said flux trap neutron absorber arrangements comprising:

(a) separate means extending vertically along and attached to the exterior of each of adjacent side walls of adjacent pairs of said spaced storage cans for forming respective pockets extending along said adjacent side walls and being spaced from one another, said pocket forming means being an outer elongated covering extending vertically along and attached along its periphery to each of said adjacent side walls;

(b) an elongated flat plate of a thermal neutron absorber material mounted in each of said pockets, said plates of thermal neutron absorber material being likewise spaced from one another and defining a fast neutron slow-down region therebetween;

(c) a slab of a metal hydride disposed in said fast neutron slow-down region between said plates of thermal neutron absorber material and said separate pocket forming means on said adjacent side walls; and (d) a canister containing said slab of said metal hydride being disposed in said fast neutron slow-down region, said canister being connected to one of said adjacent side walls of said adjacent storage cans;

(e) said canister including a hollow metal container having a rectangular cross-section defined by a pair of spaced side walls and a pair of lateral end walls extending between and rigidly interconnecting said side walls, said canister being filled by said slab of metal hydride which is disposed in contact with said side and lateral end walls of said canister, said side walls of said canister being disposed in contact with said adjacent storage cans such that no gap and thereby no fast neutron flowing fluid is present between said canister and said adjacent storage cans, (f) said canister further including a pair of lateral mounting flanges attached to and extending in opposite directions outwardly from opposite vertical edges of one of said side walls, said lateral mounting flanges being attached to opposite vertical edge portions of said respective covering.

2. The arrangement as recited in claim 1, wherein said outer covering is a plate of metal.

3. The arrangement as recited in claim 1, wherein each of said storage cans has four of said side walls, four of said canisters being respectively disposed adjacent said four side walls of said storage can, two of said four canisters being mounted by the two adjacent side walls of said four side walls of said storage can and the other two of said four canisters disposed in abutting contact with the two other adjacent side walls of said storage can.

4. The arrangement as recited in claim 1, wherein said thermal neutron absorber material of said plates is boron carbide.

5. The arrangement as recited in claim 1, wherein said metal hydride is titanium hydride.

* * * * *